June 29, 1948.　　　　E. UTTERBACK　　　　2,444,274
HEATER
Filed Aug. 14, 1946
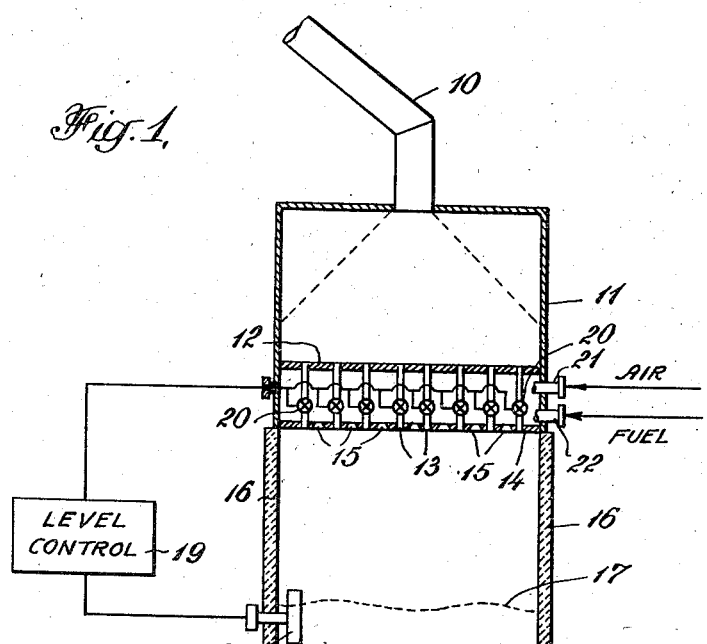
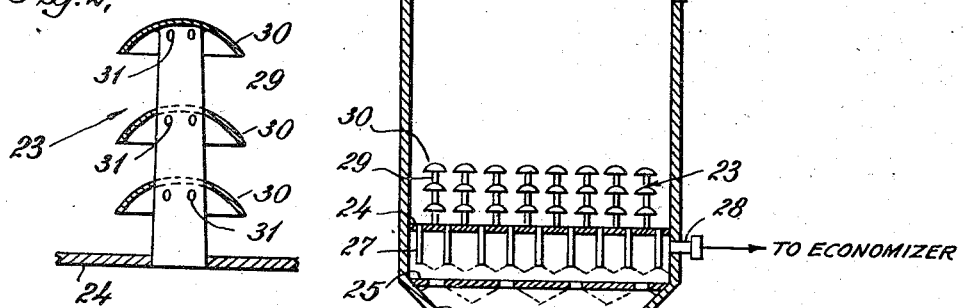
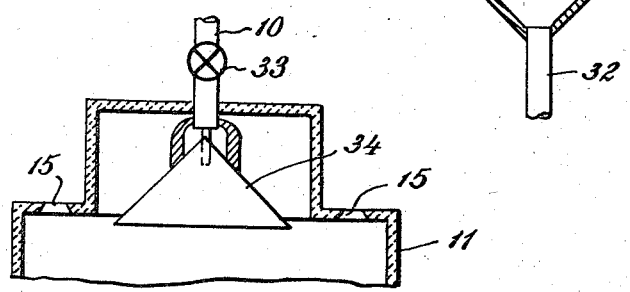
INVENTOR
ERNEST UTTERBACK
BY
ATTORNEY Patented June 29, 1948

2,444,274

UNITED STATES PATENT OFFICE 2,444,274

HEATER

Ernest Utterback, New York, N. Y., assignor to Socony-Vacuum Oil Company, Incorporated, a corporation of New York Application August 14, 1946, Serial No. 690,559

6 Claims. (Cl. 263—19)

This invention relates to a method and apparatus for heating a granular solid heat transfer material to an elevated temperature by successively subjecting it to heating by radiation and convection.

For many purposes, transfer of heat by means of a granular solid heat transfer agent is highly desirable because of the rapid rate of heat transfer that may be obtained by direct contact of a gas or liquid with granular solids. Such means of heat transfer is a highly efficient way of vaporizing liquids and solids, or promoting high temperature short time chemical reactions. For example, hydrocarbons are readily cracked to high yields of olefins such as ethylene by reactions at temperatures on the order of 1500° F. and above for short periods which avoid substantial secondary reactions in the nature of condensation to aromatics and the like. This invention is particularly directed to a method and means for rapidly raising the temperature of a granular solid heat transfer agent to the desired level. It is necessary that extremely high localized temperatures be avoided in order that there shall be no substantial fusion of the surface of the granules which would ultimately result in agglomeration and clogging of the apparatus.

According to this invention, the granular solid is passed successively through an upper radiant heating zone and a lower convection heating zone, in each of which the heat is derived from a flame propagated in the upper zone. The upper zone is lined with refractory material which is highly heated in order to subject the granular solid to intense heat radiation. The granular solid falls through this upper zone as a shower of discrete, freely falling granules to drop on a compact downwardly moving bed of granular material in the convection zone. The upper surface of the bed and the particles falling through the radiant heating zone are subjected to heating by radiation from the flame and from the highly heated refractory walls and top of the radiant heating zone. Heat is thereby put into the granules at a high level while avoiding localized overheating in the zone of heat input at high levels. The hot products of combustion, substantially reduced below flame temperatures, pass downwardly through the convection heating zone in direct contact with the granules in the latter zone. By this means the products of combustion and the granular solid are caused to be at substantially the same outlet temperatures. These and other objects and advantages of the invention will be more clearly understood by reference to the apparatus shown in the annexed drawings; wherein Figure 1 is a vertical cross-section of a heater according to the present invention, thermal insulation, supporting beams and the like being omitted for simplicity of showing;

Figure 2 is a detail view of an element of the combustion gas discharge system; and Figure 3 is a fragmentary section, similar in general nature to Figure 1, of a second modification according to the invention.

Referring specifically to Figure 1, there is shown a heater adapted for rapidly and efficiently raising the temperature of a granular solid heat transfer material such as alumina granules of 0.3 inch average diameter. Such heat transfer materials may be used for cracking of gas oil at 1550° F. for a reaction time of 0.2 second to produce about 28% by weight of ethylene. The granular solid at about 1600° F. is transferred to a suitable contacting reactor wherein it heats a gas oil charge to the desired reaction temperature and is itself reduced to a temperature of 900 to 1000° F. The cooled heat transfer material is then transferred to an elevator and returned to the top of the heater to repeat the cycle.

As shown in Figure 1, granular heat transfer material at about 1000° F. is received from an elevator by a conduit 10 which transfers it to the top of the heater indicated generally at 11. The granular solid falls onto a tube sheet 12 in the top of heater 11 to provide a bulk supply from which the solid is withdrawn as needed and supplied to the heating zones by a plurality of pipes 13 spaced about the top of the heater. The top boundary of the radiant heating zone is defined by a refractory plate 14 having a plurality of openings 15 for burners to produce a flame by combustion of any suitable fuel such as gaseous or liquid hydrocarbons. The side walls 16 of the upper radiant heating zone are also formed of refractory and the flame generated by burners in openings 15 maintain the plate 14 and the walls 16 at an elevated temperature such for example as 2500° F.

The granular solid heat transfer material falls from the tubes 13 as a shower of discrete, freely falling particles which drop onto the top surface 17 of a compact downwardly moving bed within the heater. The level 17 is maintained by a level responsive element 18 actuating a level control 19 which, in turn, operates valves 20 in the pipes 13. The flow of solid granules to control the level in the heating zone may also be adjusted by fitting each of the pipes 13 with a fixed orifice and operating a valve in pipe 10 responsive to level control 19.

Air and fuel are supplied to the heater by lines 21 and 22 respectively and are distributed to suitable burners, not shown, by manifolds which are also omitted from the drawing in the interest of simplicity.

The granules falling through the upper radiant heating zone and those constituting the upper layer of the moving bed are exposed to radiant heat and are thus caused to increase in temperature. Feeding granules at 1000° F. to be heated to 1600° F., about half the total heat requirement may be put into the granules in the radiant section by maintaining the defining walls thereof at about 2500° F.

The remainder of the total temperature rise desired is obtained by direct heat transfer between products of combustion and the granular solid in the convection zone below level 17. The hot products of combustion flow downwardly through the bed in direct contact with the granules and are at about the same temperatures as the granules by the time these gases reach outlets 23. The heated granules are withdrawn from the bottom of the heater by any suitable means for obtaining equal flow across the bottom of the heater, for example, flow control plates 24, 25 and 26 having orifices spaced about as shown to give equalized flow from a number of uniformly spaced points about the bottom of the heater. As shown, drain legs 27 provide for flow of granular solid between plates 24 and 25 thus providing a plenum chamber between plate 24 and the granular solid lying on plate 25. The products of combustion pass from the collectors 23 to the said plenum chamber in a manner to be described below in connection with Figure 2 and these gases are then discharged at outlet 28 and passed to a suitable waste heat boiler to recover heat contained therein for useful purposes.

The nature and operation of collectors 23 will be apparent by reference to Figure 2 wherein it is seen that each collector comprises a pipe 29 having a plurality of cups 30 thereabout to provide a plurality of gas disengaging spaces for removing the combustion gases from contact with the granular solid. Orifices 31 through the wall of pipe 29 beneath each of the cups 30 provide for flow to the interior of the pipe of disengaged gases which then pass downwardly through the pipe to the under side of plate 24.

As will be apparent from the drawings, highly heated granular solid heat transfer material passes by conduit 32 to any desired use such as the contacting reactor referred to above.

Figure 3 shows a somewhat different arrangement for the top of the radiant heating zone in that the pipe 10 is provided with a control valve 33 adapted for activation from level control 19 and discharges directly onto a conical spreader 34 supported in the top of the heater 11 above the radiant heating section. In this case the burner openings 15 are provided in a circle about the conical spreader 34. In other respects this modified type of heater corresponds to Figure 1.

I claim:

1. A process for heating granular solid heat transfer material which comprises maintaining a vertical radiant heating zone bounded by heat radiating surfaces and a convection heating zone therebelow and in open communication therewith, dropping said material as a shower of discrete, freely falling granules through said radiant heating zone, maintaining in said convection heating zone a downwardly moving compact bed of said material replenished at its upper surface by material falling thereon from said radiant heating zone, propagating a flame in said radiant heating zone, passing products of combustion from said radiant heating zone downwardly through said convection heating zone in direct contact with the granular solid in said bed, and removing said products of combustion from the lower portion of said bed.

2. A heater comprising a vertical vessel having an upper radiant heating section and a lower convection heating section, means to introduce granular solid to the top of said upper section as a shower of discrete, freely falling granules, burners arranged to produce a flame in said upper zone, means to remove granular solid from the bottom of said lower zone, level responsive means in said vessel, means controlled by said level responsive means to maintain an upper level of a compact solid bed of said granules at a predetermined point in said vessel defining the upper boundary of said lower zone, and means to withdraw gases from the bottom of said lower zone whereby products of combustion are caused to pass from said upper zone downwardly through said bed in direct contact with said granules.

3. A heater comprising a vertical vessel having an upper radiant heating section and a lower convection heating section, a plurality of pipes spaced about the top of said upper section to introduce granular solid thereto as a shower of discrete, freely falling granules, burners arranged to produce a flame in said upper zone, means to remove granular solid from the bottom of said lower zone, level responsive means in said vessel, means controlled by said level responsive means to maintain an upper level of a compact solid bed of said granules at a predetermined point in said vessel defining the upper boundary of said lower zone, and means to withdraw gases from the bottom of said lower zone whereby products of combustion are caused to pass from said upper zone downwardly through said bed in direct contact with said granules.

4. A heater comprising a vertical vessel having an upper radiant heating section and a lower convection heating section, a plurality of pipes spaced about the top of said upper section to introduce granular solid thereto as a shower of discrete, freely falling granules, a plurality of burners arranged among said pipes to produce a flame in said upper zone, means to remove granular solid from the bottom of said lower zone, level responsive means in said vessel, means controlled by said level responsive means to maintain an upper level of a compact solid bed of said granules at a predetermined point in said vessel defining the upper boundary of said lower zone, and means to withdraw gases from the bottom of said lower zone whereby products of combustion are caused to pass from said upper zone downwardly through said bed in direct contact with said granules.

5. A heater comprising a vertical vessel having an upper radiant heating section and a lower convection heating section, a conical spreader in the top of said upper section, means to supply granular solid to the apex of said spreader, burners arranged to produce a flame in said upper zone, means to remove granular solid from the bottom of said lower zone, level responsive means in said vessel, means controlled by said level responsive means to maintain an upper level of a compact solid bed of said granules at a predetermined point in said vessel defining the upper boundary of said lower zone, and means to withdraw gases from the bottom of said lower zone whereby products of combustion are caused to pass from said upper zone downwardly through said bed in direct contact with said granules.

6. A heater comprising a vertical vessel having an upper radiant heating section and a lower convection heating section, a conical spreader in the top of said upper section, means to supply granular solid to the apex of said spreader, burners arranged about said spreader to produce a flame in said upper zone, means to remove granular solid from the bottom of said lower zone, level responsive means in said vessel, means controlled by said level responsive means to maintain an upper level of a compact solid bed of said granules at a predetermined point in said vessel defining the upper boundary of said lower zone, and means to withdraw gases from the bottom of said lower zone whereby products of combustion are caused to pass from said upper zone downwardly through said bed in direct contact with said granules.

ERNEST UTTERBACK.